United States Patent [19]

Pellet

[11] 3,863,319

[45] Feb. 4, 1975

[54] PROCESS AND EQUIPMENT FOR THE MANUFACTURE OF WIRING HARNESSES AND SIMILAR COMPONENTS

[76] Inventor: Bernard Pellet, 23 Blvd. da la Corne d'Or, Villefranche-sur-Mer, France

[22] Filed: Apr. 3, 1973

[21] Appl. No.: 347,497

[52] U.S. Cl. ............ 29/203 MW, 29/624, 317/122
[51] Int. Cl. ............................................ H05k 13/06
[58] Field of Search ... 29/624, 203 R, 203 P, 203 J, 29/203 MW; 317/122

[56] References Cited

UNITED STATES PATENTS

| | | | |
|---|---|---|---|
| 3,163,926 | 1/1963 | Gray | 29/624 X |
| 3,407,480 | 10/1968 | Hill et al. | 29/203 MW X |
| 3,440,531 | 4/1969 | Jasorka et al. | 29/624 X |
| 3,633,096 | 1/1972 | Bollman | 29/203 MW X |

OTHER PUBLICATIONS

Price, Sloan & Smoot, "Forming Harness-Type Cable Utilizing a Signal Light System on a Cable Forming Board," Western Electric Technical Digest No. 28, Pages 35-36, October 1972.

*Primary Examiner*—Richard J. Herbst
*Assistant Examiner*—Joseph A. Walkowski
*Attorney, Agent, or Firm*—Holman & Stern

[57] ABSTRACT

A novel process and apparatus is disclosed by which the manufacture of wiring harnesses and similar components is facilitated. The technique of the instant invention constitutes the placement of a full size wiring pattern on one side of a board, and the manufacture of a wiring harness corresponding to the wiring pattern on the other side of the board. Terminal blocks are provided at the end points of each conductor of the wiring pattern, which terminal blocks are illuminated with a first signal so as to indicate to the operator the proper terminal blocks for connection of a conductor of the wiring harness being assembled thereto. When one end of a conductor of the wiring harness being assembled is placed into the proper terminal block, the illumination thereat is extinguished and the visual signal provided at the other terminal block to which the conductor is to be connected is modified. Connection of the remaining end of the conductor to the terminal block displaying the modified signal serves to extinguish the modified signal, indicating that a proper connection has been made. The illumination patterns generated therefore indicate proper terminal points for each conductor of the wiring harness being assembled, and extinguishment of the visual signals will occur only when proper connection has been made.

14 Claims, 5 Drawing Figures

PROCESS AND EQUIPMENT FOR THE MANUFACTURE OF WIRING HARNESSES AND SIMILAR COMPONENTS

BACKGROUND OF THE INVENTION

This invention relates to an improved process for the manufacture of wiring harnesses or conductor groups for wiring of electrical machinery and installations, which harnesses find utility in the electrical, electromechanical, automobile, telecommunication, electronic and computer industries, among others. The invention further is concerned with the provision of equipment particularly designed to implement this manufacturing process.

The manufacture of wiring harnesses basically comprises the steps of cutting several conductors to appropriate length and fastening such conductors together so as to form a subassembly or wiring harness which allows easy and rapid final assembly and interconnection of electrical equipment and parts thereof.

One very old but still utilized method of manufacturing such wiring harnesses consists of the indicating or denoting of the terminal or end and starting points of each wire by disposing nails on a wooden board. Additional nails may be used if necessary to lay out and denote the path of the wires by indicating, for example, bends and other changes of wire direction. Such a known process presents several disadvantages particularly as concerns the need for lengthy preparation of the nail board by a specialized worker, a disadvantage which prohibits the process from being used for short production runs. For repetitive and larger production runs, it is necessary to store the nail boards so prepared, each one of the boards, of course, being useful only for the realization of a particular wiring pattern or model of wiring harness.

This known process has been improved by the replacement of the above-described nail board by a honeycombed worktable having cells or holes of uniform size and distribution. Each of the holes can hold a peg or plug carrying either a terminal clamp for the end of a conductor or an elastic holder permitting the conductors to temporarily be maintained in position at different points along their path. The implementation of the improved process involves merely the prior execution of a wiring plan or pattern in full size, the laying out and fastening of the plan on the worktable, with the pegs bearing the terminal clamps or the intermediary elastic holders being then pushed through the plan at appropriate places into corresponding and underlying holes of the honeycomb worktable. This process represents a definite advance compared to the previously described method in that the worktable may be indefinitely used, it being suffficient to retain only the individual plans corresponding to the different patterns or models of wiring harnesses to be manufactured. This improved process, however, does not eliminate all the disadvantages known to those skilled in the art because the worker performing the assembly must, prior to laying each wire on the worktable, always refer to the indication marked on the plan or to assembly instructions. As a consequence, even for qualified workers, a certain loss of time and risk of error exists which increases with the complexity of the wiring harness to be manufactured. In addition, when such errors occur, there is generally no way to discover them prior to the testing of the finished harness.

SUMMARY OF THE INVENTION

The primary objective of the instant invention is the provision of a wiring technique and apparatus therefor which eliminates the disadvantages of the prior art described above.

To this end, the invention contemplates, a process for the manufacture of wiring harnesses and similar components which considerably simplifies the worker's task by eliminating the need for reference to a graphic description, substituting therefor a prototype harness which is used as the pattern to be reproduced. Yet, the inventive process is such that the basic tasks of placing the conductors in position is still "visualized" by means of luminous guide-marks which are automatically activated as work progresses, and which further serve to automatically signal any errors which may be made during the course of work. The novel process diminishes the attention required from the operator and allows the operator to speed up the rate of work without increasing stress or fatique, and further allows the employment of a non-specialized work force.

The process or technique for the manufacture of wiring harnesses according to the invention will be seen to include the initial preparation of a full size pattern or model wiring harness of a plurality of conductors, the pattern harness being fastened to one side of a perforated or substantially transparent board with the two stripped ends of each conductor of the pattern harness being connected to a respective terminal block, which blocks are disposed through the perforated structure or board at appropriate locations defining the "start" and "finish" points of the respective conductor. Electrical power is supplied to the terminal blocks which results in the appearance on each such block of a luminous signal visible to the operator who would be looking at the other or reverse side of the perforated structure or board. The conductors of the wiring harness which is to be manufactured are then placed on this other or reverse side of the perforated structure in superposition over the path of the conductors previously connected in the pattern harness. The engagement of one end of each of these conductors in the terminal block defining the "start" point automatically results in the disappearance of the luminous signal of such block and in the modification of the luminous signal emanating from the corresponding terminal block defining the "finish" point, such latter signal disappearing, in turn, when the other end of the same conductor is subsequently engaged in the "finish" terminal block.

In accordance with other characteristics and features of the invention, a flat wire net with equidistant meshes or openings is used as the perforated structure or board, the distance between the meshes being equal to, or a multiple of, a standard spacing or unit of electrical connection. More precisely, the wire net with equidistant meshes is composed of two or more sheets of metallic nets superposed in coincident alinement, such sheets being appropriately spaced and insulated one from the other so that they may also serve for the supply of electrical power to the terminal blocks disposed through their alined meshes.

In accordance with yet another characteristic of the invention, the luminous signal which appears on each pair of start and finish terminal blocks after the connection of a conductor of the pattern harness to such blocks is a continuous signal, whereas the modified signal of the finish terminal block is a blinking signal which occurs after the engagement in the corresponding start block of the end of a conductor of the harness to be manufactured. The result is an especially convenient visualization to the operator since the blinking light indicates the particular finish terminal block to which the particular conductor of the harness being formed must be connected. This also serves as an immediate indication in the case of an error in connection because then the modified signal continues blinking and thus attracts the attention of the operator.

BRIEF DESCRIPTION OF THE DRAWINGS

The characteristics and advantages of the inventive wiring technique will become more apparent from the following description of an installation or apparatus particularly designed to carry out the method, which description is merely exemplary and refers to the drawings attached hereto, in which.

DETAILED DESCRIPTION OF A PREFERRED EMBODIMENT

As discussed above, the novel inventive process differs from those of the prior art in that the process avoids all references to any graphic illustration or plan of the harness to be manufactured. The technique of the instant invention primarily consists of the initial preparation, before the manufacture of the harness itself, of a pattern or model wiring harness of full size, the pattern or model wiring harness serving as the actual pattern to be copied and being fastened on one of the sides of a flat perforated structure which forms the actual worktable.

With particular reference to the drawings, such fastening is performed by the insertion of previously stripped ends of each "pattern" conductor F of the pattern or model harness into the connecting posts C of the two terminal blocks which have been conveniently secured in the perforated structure, one of the blocks D being referred to as the start block, and the other block E being referred to as the finish block. The pattern harness thus fastened at its ends may also be supported at various intermediate points of its path by elastic positioning clips G which are also inserted into the perforated structure or board. This structure which preferably is mounted so as to be pivoted about a horizontal axis is then rotated about such axis so as to make accessible its other or reverse side.

The preparatory tasks now being accomplished, the operator may proceed to the assembly of the actual wiring harness to be manufactured by arranging the conductors one after the other on the reverse side of the perforated structure in superposition above the path of the corresponding conductors of the pattern harness, which pattern harness would be visible through the perforated structure or board.

The ends of each conductor of the harness being manufactured, which ends may or may not be stripped of insulation, are also engaged in the same terminal blocks D and E, respectively, to which the ends of the corresponding conductor of the pattern harness have previously been fastened on the other side of the perforated structure. Such conductor of the harness being manufactured may also be held or positioned at different points along its path by elastic positioning clips G which may or may not be in coincident alined position with those clips holding the pattern harness on the other side of the board, such clips holding together the plurality of conductors until the termination and tying or binding of the completed harness.

The terminal blocks in which the ends of the conductors of both the pattern harness and the harness being manufactured are engaged serve, in addition to the mechanical function of holding the ends of these conductors in place, a marking and signalling function by which the operator of the apparatus immediately learns to which finish block the conductor being placed must be fastened and further, the operator learns of any possible connecting error which is automatically signalled.

Figure 1:
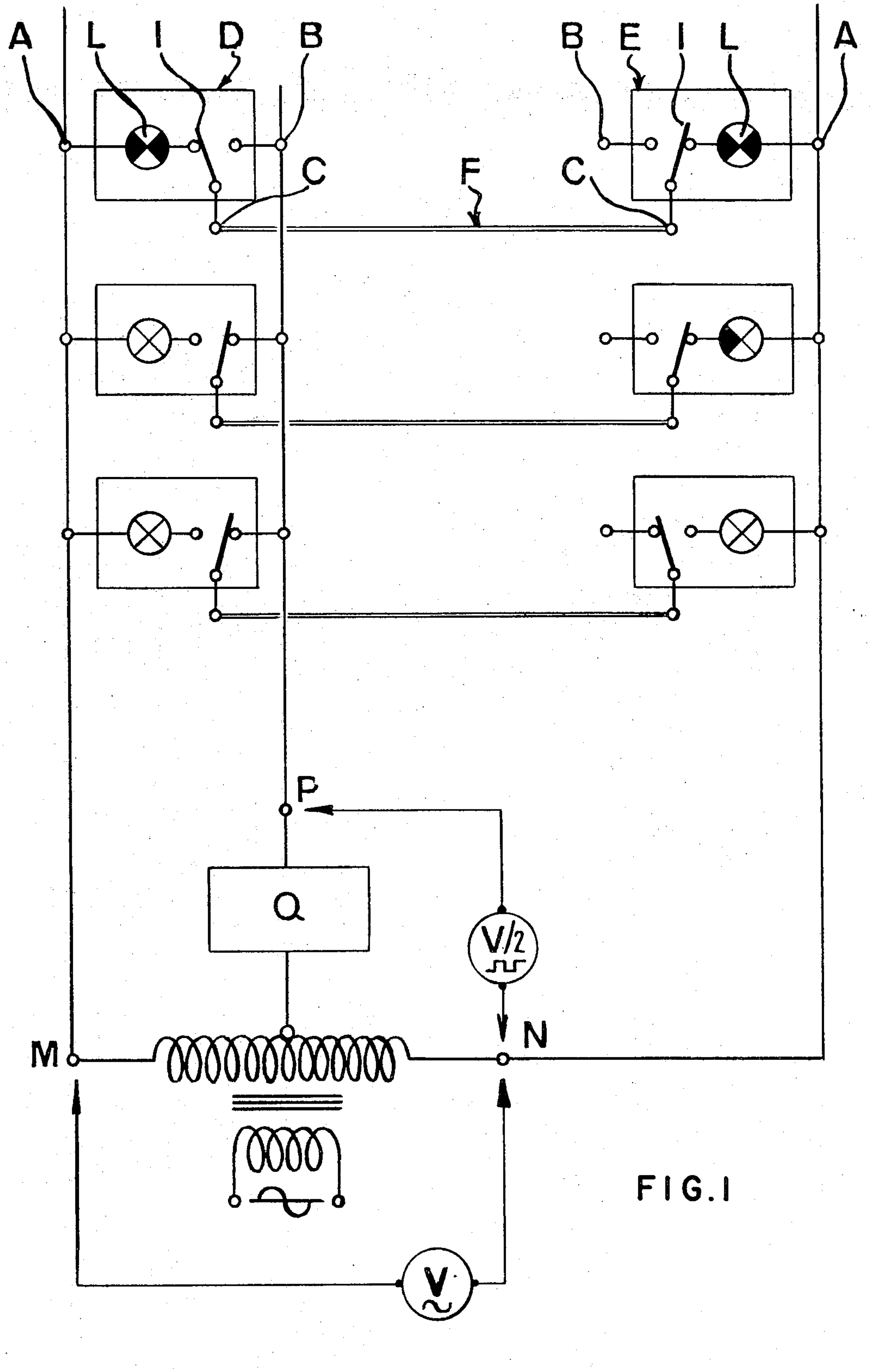
FIG. 1 is a schematic drawing showing generally, for each elemental conductor of the wiring harness to be manufactured, the three successive positions of the signalling device employed.

To this end, and as shown in the schematic drawing of FIG. 1, each terminal block is provided with three electrical connecting posts or terminals A, B and C, with a signal lamp L being disposed on the side of the terminal block which would be visible to the operator. Each terminal block is further provided with a built-in change-over switch I the operation of which is controlled by a gripping device which will be described hereinbelow and which is utilized by the operator to secure one end of the conductor of the harness being manufactured. All of the terminal blocks utilized are of the same type, since, as will be shown hereinbelow, a device permits a terminal block to be converted from a start block into a finish block merely by a change in the electrical supply thereto.

As shown in the drawing and particularly in FIG. 1, the posts or terminals A of the start block D are connected to a terminal M of the secondary winding of a transformer which delivers alternating current at a safe voltage V, the terminal P of a device Q supplied from the midpoint of the secondary winding delivering pulsating current at a voltage V/2. The terminals A of the finish block E are connected to the other side N of the secondary winding of the transformer, terminal N playing the role of a common point of a reference for the two sources of signalling alternating current V at terminal M and pulsating current V/2 at terminal P at which point the terminals or post B of the start block D are connected. The posts B of the finish block C are not connected but are left floating. On both the start and finish terminal blocks, the terminal C is provided for the connection of the stripped end of a conductor F of a pattern harness.

FIG. 1 further schematically depicts the principle of the marking and the signalling system of the instant invention by indicating the three successive stages necessary to effect a connection for any of the conductors of the wiring harness to be manufactured, which conductors are not illustrated for reasons of clarity.

The ends of a conductor F of the pattern harness are connected to the post C of the start block and to the finish block E assigned to the particular conductor. The change-over switches I would therefor be in the position indicated in the upper part of the drawing and the two pilot lamps L are then energized in series through conductor F with alternating current having a voltage V which would be twice their normal voltage. Accordingly, both lamps L would emit a continuous luminous signal and a mere glance by the operator would be sufficient to ascertain that all start and finish blocks are lit when work is commenced, the non-lighting of a corresponding pair of lamps indicating either that one of the lamps is burned out, or that one of the connections of the wires F of the pattern harness is broken.

Assuming everything to be in order and that all pilot lamps are lit after placement of the wires F of the pattern harness, the operator would begin the work of assembly of the actual harness by inserting one end, either stripped or unstripped, of a conductor of the harness to be manufactured in the gripping device of the corresponding start block D. This would result in the opening of the changeover switch I of this block, which serves to switch off its associated pilot lamp L while the lamp of the corresponding finish block E would be switched over to the pulsating current V/2 from terminal P connected to the midpoint of the transformer winding. Accordingly, the finish terminal block to which the particular conductor being placed must now be connected gives a blinking rather than a continuous signal which clearly indicates to the operator the specific end point for the conductor held in his hand. As the operator inserts the free end of this conductor into the gripping device of the proper finish block E, the change-over switch of the finish block E is opened in turn, thus switching off the corresponding lamp L. If, by mistake, the operator connects the end of the conductor to an improper finish block, the disappearance of the continuous luminous signal of the respective pair of terminal blocks and the continued blinking signal of the finish block that should have been connected into would immediately point out to the operator that an error has been made. When all lamps L of the start and finish terminal blocks are not illuminated and switched off, the operator is apprised that the assembly of the harness is complete.

Figure 2:
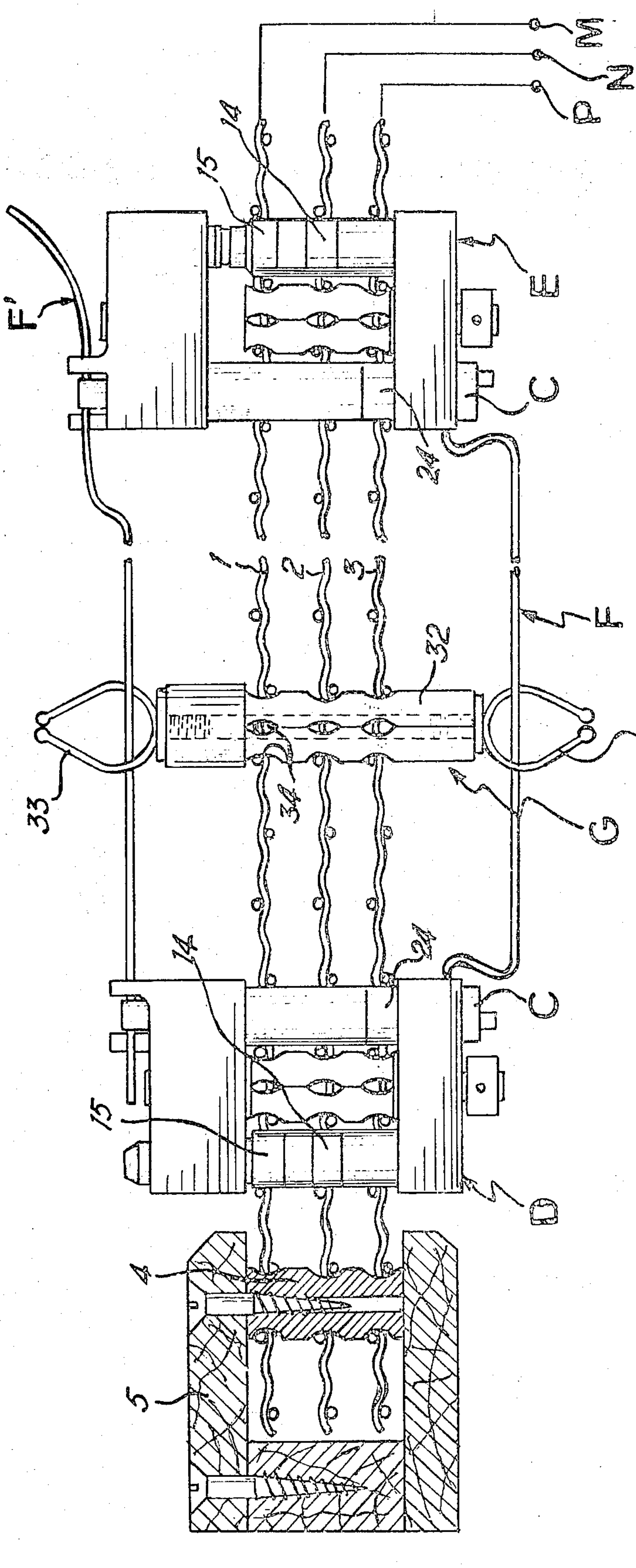
FIG. 2 shows, in longitudinal section, the perforated structure or board used in carrying out the process, its supporting frame, and a pair of start and finish terminal blocks conncected to the same conductors of the harness as well as an intermediary guidepost.

The necessary equipment to carry out the process of the instant invention is schematically shown in partial section in FIG. 2 of the drawings. Such equipment essentially consists of a perforated structure formed by a network having equidistant meshes, such network constituting three superposed sheets of metallic wire netting 1, 2 and 3, respectively, in addition to the terminal block more particularly described hereinbelow. The meshes of the metallic netting may be square or polygonal in form, but the distance between the meshes conveniently being chosen to be equal to or a multiple of a standard spacing of electrical connector clamps in commercial use. Thus, the adjacent ends of the different conductors of the harness will have the relative spacing necessary for their subsequent connection with electrical equipment and apparatus. The three sheets of netting 1, 2 and 3, are superposed in such a manner as to put the respective meshes thereof in coincident alinement. The sheets are also held at a proper distance or spacing from each other by means of insulating braces 4 placed at their periphery and, if needed, also placed at appropriately selected different points on their surface. The network thus formed is imbedded about its periphery in a rigid wooden frame 5 which is conveniently mounted to rotate about its horizontal symmetrical axis and therefore may be pivoted on a firm base (not illustrated.) The three sheets of the network are connected to terminals M, N, and P, respectively, of the signalling current source of FIG. 1 as described above. Accordingly, the sheets of netting are utilized not only to hold the various terminal blocks, but also serve to electrically connect such terminal blocks. As an alternative, it is possible to utilize only two sheets of netting with the connection of the terminal block with the third terminal of the signalling current source being realized by some other convenient means. Preferably, for obvious reasons of convenience, it is desirable to utilize a network having three superposed sheets of netting as depicted in FIG. 2 of the drawings.

Figures 3A, 3B:
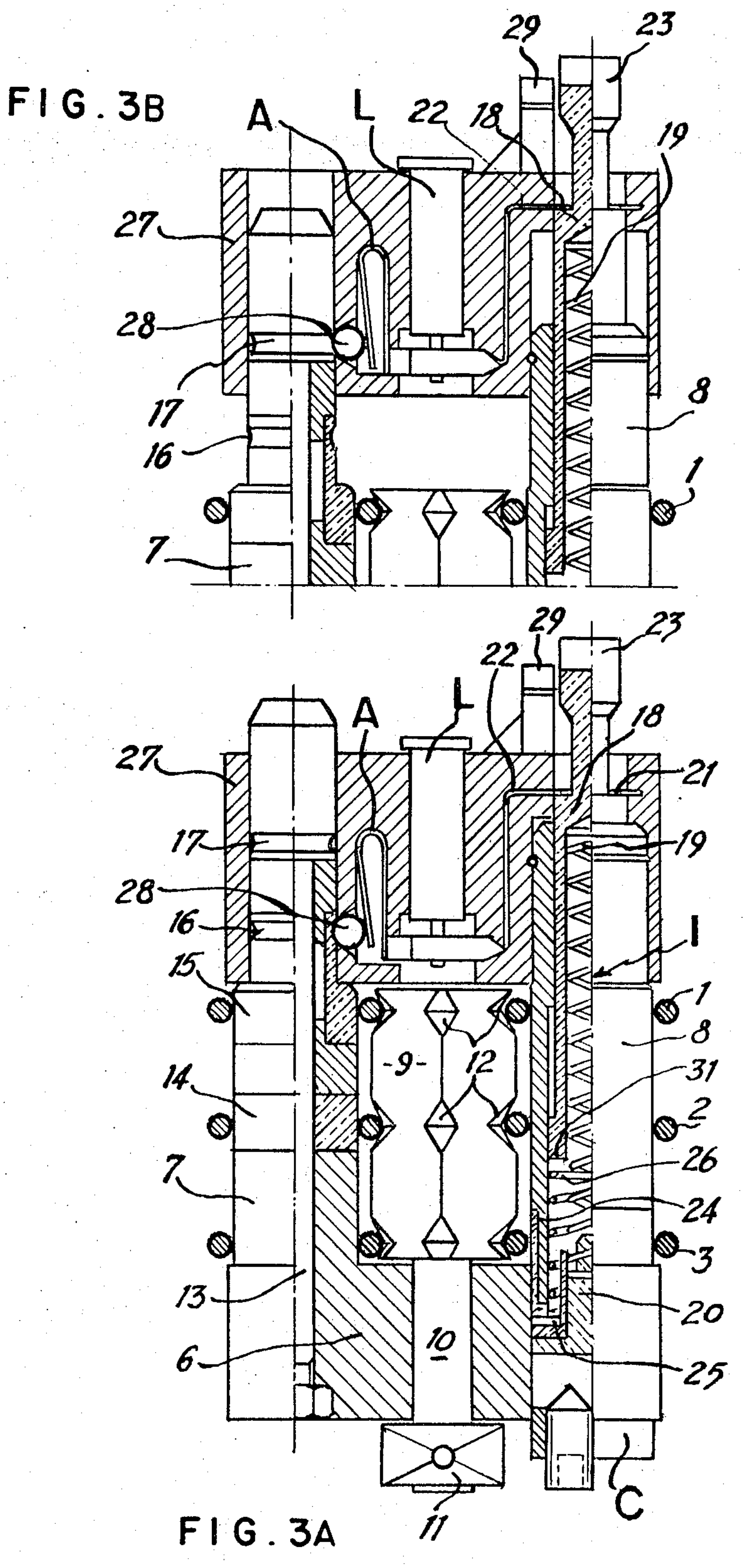
FIGS. 3*a* and 3*b* show, in longitudinal section and in larger than full scale, the inner construction of a terminal block disposed at the start and finish position, respectively.
Figure 4:
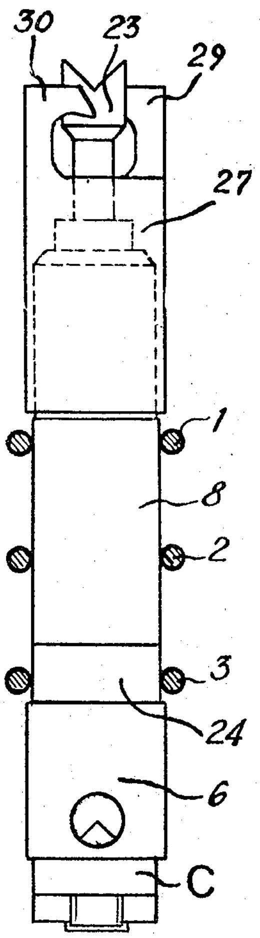
FIG. 4 shows the same connecting block in vertical section.

The construction of the start and finish connecting blocks which are the same will be described by reference to the drawings and particularly to FIGS. 3*a*, 3*b* and 4 thereof. Each of the terminal blocks is formed by two separate portions which may be snapped one on top of the other from the two sides of the perforated structure serving as the worktable. The lower portion of each block constitutes two cylindrical and parallel pegs or legs 7 and 8 constructed of insulating material and joined to one another by a cross-member 6 also of insulating material. The diameter of pegs or legs is approximately equal to the width of the meshes of the netting, and the distance between the axis of the legs is, in the illustrated embodiment, equal to double that of the space in between the meshes of the netting. Thus, each of the pegs or legs would fit into a line of meshes of the network formed by the sheets of wire netting 1, 2, and 3. The ends of the pegs inserted into the meshes would project well beyond the plane of the upper sheet of netting 1 when the cross-member 6 rested against the lower sheet of netting 3. The cross-member 6 which joins the pegs or legs 7 and 8 also holds at its center, at a point equidistant from the legs, a pivoting locking device 9 integrally constructed having an axis 10 at the end of which an exterior handling nut 11 is disposed. As shown in FIG. 3*a*, the locking device preferably consists of a prismatic axis of insulating material of the same cross sectional shape, a square in this example, and of slightly smaller size than the meshes of the netting, the edges being notched by sections of circular grooves 12 at the same axial distance from each other as are the sheets forming the network, and of a diameter at the bottom of the groove approximately equal to the width of the meshes of the netting sheets. Accordingly, once the lower part of a terminal block is inserted into the network, it is sufficient to impart an eighth of a turn to the locking device 9 so as to maintain the block fixed in working position.

The insulating peg or leg 7 contains a conducting core 13 consisting, for example, of a metal screw. The peg further has two current-collecting rings 14 and 15 disposed at the level of the sheets of netting 1 and 2, respectively. The first of the rings is electrically connected to the core 13 of the peg, while the second of the rings is insulated therefrom. The second ring 15 extends beyond the level of the sheet 1 by a smaller diameter portion bearing an annular groove 16 at its end. Another identical groove 17 be made at a certain distance from the first groove at the end of the conducting core 13. The function of these two grooves will be described further hereinbelow.

The other insulating peg or leg 8 is hollow, unlike the first leg, and is utilized as a seating or base for the change-over switch I of the terminal block. This change-over switch incorporates a sliding metallic push-rod 18 coaxially guided inside the peg 8 and electrically connected by a prestressed compression spring 19 to a rigid stop 20 formed by an interior protrusion of the connecting post C which passes through the insulating cross-member 6 and which receives the end of a conductor F of the pattern harness.

Spring 19 forces the push-rod 18 toward the top of the drawing and keeps the push-rod, at its shoulder 21, elastically pressed against a conducting metal strip 22 constituting the other portion of the connecting block and serves as a resting contact with respect to the change-over switch I. The upper or exterior end 23 of the push-rod 18, which preferably may be made of or covered with a layer of insulating material, constitutes the moving part of the gripping device of connecting block to be described below. The insulating peg or leg 8 also bears at its bottom portion and at the level of the lower sheet of netting 3 another current-collecting ring 24 which is electrically connected, by means of a metallic washer 25 to still another compression spring 26 coaxially surrounding spring 19 and which serves as a working contact with respect to the change-over switch Ir, as will be discussed.

As should be evident from the preceding description, the three current-collecting rings 15, 14, and 24 allow the electrical connection of the terminal block through the sheets of netting 1, 2, and 3 with signalling current terminals M, N, and P respectively. It should also be appreciated that the locking device 9 supported by the lower portion of the terminal block additionally serves to improve the quality of the contact between the sheets of netting and the corresponding collecting rings by increasing the pressure exercised by the meshes on such rings through cam action.

The upper portion of the terminal block which, after insertion and locking into place of the lower portion of the block in the mesh sheets comprising the network, serves to cap the ends of the pegs or legs 7 and 8 from the working side of the network or perforated board and essentially comprises an insulating portion 27 having two openings in coincident position with and of the same size as the ends of the pegs and a central opening of lesser diameter which serves as a seating for the miniature signalling lamp L. One of the terminals of the lamp is connected to a flexible metallic strip A serving as a connecting terminal or post as indicated in FIG. 1. The end of such strip elastically holds the metallic snapping ball 28 against the top of an opening having the shape of a tructuated cone. The other terminal of lamp L is connected to the rigid metallic strip 22 discussed above and serves as a resting contact with respect to the change-over switch I. As a comparison between FIGS. 3*a* and 3*b* will indicate, ball 28 may fit into either the lower groove 16 or the upper groove 17 of the insulating peg or leg 7 of the terminal block. The ball accordingly determines the two different positions of the two respective portions of the terminal block snapped together. In the closer position indicated in FIG. 3*a*, the connecting terminal A was electrically coupled through ring 15 to sheet 1 of the network and thus to terminal M of the signalling current source, which position assigns to the terminal block the function of a start block. In the other position of the terminal block portions, the further or spaced apart position depicted in FIG. 3*b*, the connecting terminal A is electrically coupled through the conducting core 13 and through the collecting ring 14 to sheet 2 of the network and thus to terminal N of the current source, which position assigns to the terminal block the function of a finish block as described above.

The upper portion of the terminal block further carries the rigid elements of the gripping device which is intended to hold in place one end of a conductor of the wiring harness to be manufactured. Such rigid elements preferably consist, as illustrated, of two hold-down hooks 29 and 30, one being disposed on each side of the exterior end 23 of the push rod 18 which forms, as discussed above, the moving portion of the gripping device. As is clearly shown in FIG. 4 of the drawings, the end 23 of the push-rod is cut in a V-form and is positioned at such a level relative to the hooks 29 and 30 that it becomes necessary to push in the push-rod against its return-spring 19 before the end of a conductor of the harness being manufactured can be inserted under the hooks. The rigidity of the conductor inserted under retaining hooks 29 and 30 subsequently keeps the push-rod in its pushed-in position in which the contact between the rod shoulder 21 and the metallic strip 22 forming the resting contact of the change-over switch I is broken. Pushing-in of the push-rod 18 causes its internal end 31 to abut against the end of spring 26 which constitutes the working contact of the change-over switch I. The length of this spring in its rest position, however, is such that the contact between end 31 of the push-rod 18 and the upper end of the spring is established only when the connecting block is snapped into its closer position, as indicated in FIG. 3*a*. When the block is in its further or spaced apart position as shown in FIG. 3*b*, the greater distance separating the end 31 of push-rod 18 from washer 25 connected with collecting ring 24 is such that the pushing-in of the push-rod does not serve to abut its end 31 in contact with the upper end of spring 26. Thus, in the first of these two positions, pushing-in of the push-rod 18 not only causes the opening of the current supply circuit to lamp L, but also switches the connecting terminal C to the collecting ring 24 and therethrough to the lower sheet of netting 3 which itself is connected to terminal P of the signal current source. This connection corresponds to that indicated as the start block of FIG. 1. In the other position, the pushing-in of the pushrod 18 leaves the terminal C non-connected and floating which corresponds to the connection indicated as the finsh block of FIG. 1.

From the preceding explanation, it follows that the terminal block is capable of serving as a start block as well as a finish block according to the particular snapped position selected. The respective positions of two paired blocks is schematically illustrated in FIG. 2 of the drawings in which the conductor F of the harness being manufactured is also shown after it has been disposed in place. The insertion of the terminal blocks into the perforated structure and their removal is remarkably simple, while the locking device with which these blocks are provided eliminates all risk of accidental release during operation.

The upper portion of the terminal blocks may also serve as a support for reference marks which would provide, in written or coded form, instructions concerning the selection of conductors for the wiring harness to be manufactured, such as diameter of the wire, color of insulation, labels or conventional guide marks concerning future use, and the like. Such instructions or indications may be given by means of removable labels, marking pins constituting coded guide marks, and the like and it is further possible to provide for a system of adhesive or attached labels directly disposed on the gripping device which are automatically affixed to the ends of the conductors of the harness being manufactured as these conductors are inserted into the gripping device. Accordingly, in a single movement, the operator of the apparatus would perform not only the placement but the labeling of conductors of the wiring harness being manufactured.

The apparatus of the instant invention may also include in accordance with conventional techniques, devices for the intermediate routing and temporary holding or maintenance in place of conductors of the harness being manufactured. FIG. 2 of the drawings depicts such a device G which, in this instance, consists of a prismatic axis 32 inserted and locked in position in a line of meshes of the network, and holding removable and swivel-type elastic clips or braces 33 at each end. The axis 32 corresponds in its construction to that of the locking device 9 of the terminal blocks. It presents a cross-section of the same form and of slightly smaller size than that of the meshes of the netting and its edges are likewise notched by sections of circular grooves 34 at the same axial distance from one another as are the sheets 1, 2, and 3 of the netting, and of a diameter at the bottom of the groove which is approximately equal to the width of the meshes Accordingly, the axis or member 32 can be freely inserted in a line of meshes and there locked in place by a limited rotational movement which, in the present instance wherein the meshes have been described as being square, constitutes an eighth of a turn. The elastic clamp 33 fixed on the ends of the axial members 32 serve, on one side of the network, to hold the pattern harness in place and, on the other side of the network, such clamps serve to mark the course or path of travel as well as to temporarily hold in place conductors F of the harness being manufactured. When the wiring harness is finished, the conductors thereof are tied or bound so as to constitute an integral unit. The conductor ends are then freed from the gripping devices which hold them to the terminal blocks and the unit is thereafter slipped out of the elastic clips 33 and removed from the worktable. The equipment thus becomes available for the assembly of another wiring harness.

While a preferred embodiment of the instant invention has been illustrated in detail hereinabove, it should be understood that the scope of the invention is not limited to the particular details of the embodiment described which embodiment is, aforementioned, only exemplary. Further, whereas the instant invention and particularly the apparatus illustrated above has been described as being useful for the manufacture of wiring harnesses, the manufacture of other industrial products can similarly be effected. For example, the apparatus of the instant invention could be utilized in the manufacture of a harness of thin flexible tubes used for the assembly of fluidic control circuits and apparatus. In such a case, only the pattern harness would consist of electrical conductors to which a configuration would be given which is identical with that of the tubing harness to be manufactured. Further modifications to the invention will become apparent to those skilled in the art.

From the foregoing description, the object initially set forth at the outset of this specification have been successfully achieved.

Accordingly, I claim:

1. An apparatus for manufacturing wiring harnesses, said apparatus comprising, in combination:

semitransparent board means providing two oppositely disposed surfaces, one of said surfaces being adapted for placement of a pattern harness thereon, the other of said surfaces being adapted for the placement and assembly thereon of the wiring harness to be manufactured in superposed relationship with respect to the pattern harness which is viewed through the board means;

terminal block means disposed through said board at locations defining start and finish terminal blocks for the end points of each conductor of the pattern harness, each terminal block means having terminals thereon extending to opposite sides of said board means for connection to the same respective end of a conductor of the pattern harness and the respective conductor harness to be manufactured;

controllable illuminating means disposed on each terminal block means so as to provide a visual signal; and circuit means connected to each terminal block means and to said controllable illuminating means and including change-over switch means integral with said terminal block means, said circuit means being automatically responsive;

1. to the connection of each end of a conductor of the pattern harness to the terminals of a respective start and finish terminal block to effect illumination of said respective start and finish terminal block with a visual signal, and

2. to the connection of an end of a conductor of the wiring harness to be manufactured to the terminal of said respective start terminal block to effect extinguishment of said visual signal at said respective start terminal block and modification of said visual signal at said respective finish terminal block, and

3. to the connection of the other end of said conductor of the wiring harness to be manufactured to the terminal of the respective finish terminal block to effect extinguishment of said modified visual signal.

2. An apparatus as defined in claim 1, wherein said visual signal is a continuous light and wherein said modified visual signal is a blinking light.

3. Apparatus as defined in claim 2, wherein said board means comprises a rigid frame of insulating material adapted for pivotal movement, and a network having equidistant meshes formed by three sheets of metallic wire netting superposed in coincident alinement and imbedded at their periphery in said rigid frame, each sheet being held at a distance and insulated from each other; means respectively connecting each sheet to the common point and to the output terminal of two sources of signalling current, one source being continuous alternating current at a given voltage and the other being a pulsating current at one half said given voltage, said terminal block means comprising blocks of insulating material insertable in the alined meshes of the wire netting at desired locations, each of said blocks being provided with current-collecting rings at the same axial distance from each other as the sheets of netting in which they are inserted and each said block also having at one end said terminal for connection to a conductor of the pattern harness and on the other end a signalling lamp and a gripping device, which gripping device defines said terminal for the fastening of a conductor of the harness to be manufactured, the engagement of a conductor in said gripping activating said integral change-over switch means, said change-over switch means when not activated effecting series connection of lamps on a respective pair of start and finish terminal blocks through a conductor of the pattern harness to said source of signalling current at said given voltage, said switch means upon activation effecting switching off of the lamp of said start terminal block and switching the lamp of the finish terminal block to the other signal current source activation of the change-over switch of said finish terminal block breaking the circuit to its associated lamp.

4. Apparatus as defined in claim 3, wherein each of the terminal blocks is formed by two parts which may be snapped one on top of the other, one such part comprising two parallel pegs of insulating material designed so that each would fit into a line of meshes in the netting, said pegs bearing said current-collecting rings and being joined one to the other by a cross-member which bears said connecting post for the conductor of the pattern harness, said other part which caps the free ends of said pegs bearing said signalling lamp and the gripping device for the conductor of the harness to be manufactured.

5. Apparatus as defined in claim 4, wherein said parts of the terminal block are constructed to be snapped together in two different positions, the closer position assigning the function of a start block and the position further apart assigning the function of a finish block.

6. Apparatus as defined in claim 5, wherein one of the pegs bears two current-collecting rings designed to engage in the wire nets connected respectively to the terminal of the source of current at said given voltage and to the common point of the two sources of current, and wherein said two different snapped-in positions effect electrical connection of one of the signalling lamps to the first or to the second of said collecting rings, respectively.

7. Apparatus as defined in claim 6, wherein said other peg bears a current-collecting ring designed to engage in the wire net connected to the terminal of the source of the current of half said given voltage and wherein said peg serves also as a seating for said change-over switch means of the terminal block, a common point of said change-over switch means being electrically connected to the connecting terminal for the conductor of the pattern harness, a resting contact of said switch being connected to the other terminal of the signalling lamp, and a working contact of said switch means respectively establishing a connection with said collecting ring depending on whether said parts forming said block are snapped in the closer position or in the position further apart.

8. Apparatus as defined in claim 7, wherein said change-over switch means of said terminal block includes as a common point a metallic push-rod mounted coaxially with said peg and electrically connected to said connecting terminal by means of a compression spring which pushes it towards, and maintains it against, the resting contact, wherein the exterior end of said push-rod extends beyond the terminal block and constitutes the moving part of the gripping device for the conductor of the harness to be manufactured.

9. Apparatus as defined in claim 8, wherein said gripping device also includes two hold-down hooks forming one piece with the other part of said terminal block, said hooks being on each side of the exterior end of said push-rod and the insertion of the end of a conductor of the harness to be manufactured necessitating the prior pushing-in of the push-rod against its return-spring, said push-rod then being kept in its pushed-in position by the rigidity of said conductor.

10. Apparatus as defined in claim 9, wherein said working contact of the change-over switch means of said terminal block includes another compression spring mounted coaxially with the return spring of the push-rod and placed between the internal end of the latter and said collecting ring, the length of said spring in its extended state being inferior, when the two parts forming the terminal block are snapped in their position further apart, to the axial distance separating said ring from said interior end of the push-rod when the latter is pushed in, but superior to this same distance when said parts are snapped in their relatively closer position.

11. Apparatus as defined in claim 10, wherein the distance between the axis of said two pegs of the terminal block is equal to or double the distance between the meshes of the wire netting, and wherein the cross-member which connects said pegs bears at its center, equidistant from said pegs, a pivoting locking means designed to engage in the sheets of netting to secure the terminal block in place after placing and also to improve the quality of the contact between said sheets of netting and the current-collecting rings by increasing their relative contact pressure.

12. Apparatus as defined in claim 11, wherein said pivoting locking means comprises a prismatic axial member of insulating material placed parallel to said pegs of said terminal block and having the same shape in cross section as and slightly smaller dimensions than said meshes of the wire nets, the edge of said axial member bearing sections of circular grooves at the same axial distance from each other as the sheets of wire nets and of a diameter at the bottom of the groove approximately equal to the width of said meshes.

13. Apparatus as defined in claim 12, wherein said part of said terminal blocks bearing said signalling lamp and said gripping device also bears reference marks thereon giving an indication of at least one of the diameter and of the color of the conductors to be used for the assembly of the harness to be manufactured.

14. Apparatus as defined in claim 13, further including a plurality of intermediary routing devices equipped with elastic clamps which temporarily permit holding in place of the conductors of the harness being manufactured, said devices being implanted in the lines of meshes of the wire nets and having a holder formed by a prismatic axial member of insulating material having the same shape in section as, and slightly smaller dimensions than, the meshes of the wire nets, and having edges bearing sections of circular grooves at the same axial distance from each other as the sheets of wire nets and of a diameter at the bottom of the groove approximately equal to the width of said meshes, said holder being freely inserted in a line of meshes and locked there in position by a limited rotating movement about itself.

* * * * *